3,067,259
Patented Dec. 4, 1962

3,067,259
ALKOXY TRI-NUCLEAR PHENOLS
Hubert Charles Bailey, London, England, assignor to The Distillers Company Limited, Edinburgh, Scotland, a British company
No Drawing. Filed Dec. 8, 1958, Ser. No. 778,633
Claims priority, application Great Britain Dec. 19, 1957
1 Claim. (Cl. 260—613)

The present invention relates to di- and tri-nuclear phenols having antioxidant properties.

It is known that several types of di- and tri-nuclear phenols may be incorporated as antioxidants into polymeric materials such as paraffin wax, polyvinyl chloride and polyethylene, and also into organic esters. Known types of phenols include 2:4:6-trialkyl phenols; diphenylol methane and its alkyl-substituted derivatives; diphenylol propane and its alkyl-substituted derivatives such as di-o-cresylol-propane; di- and tri-nuclear phenols derived from p-cresol and containing methylene bridges and their alkyl-substituted derivatives such as 2:2'-methylene-bis(4:6-dialkyl-phenols). Gem-bis(2-hydroxy-5-alkoxy phenyl) alkanes are also known, the presence of the alkoxy group in the para position in the molecule relative to the hydroxyl group being regarded as critical in order for the compound to have effective antioxidant properties.

The present invention is an alkoxy-substituted di-nuclear phenol having the structural formula

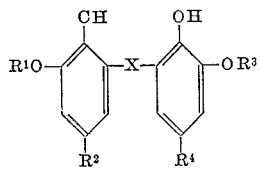

or the structural formula

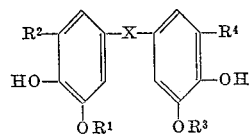

or an alkoxy-substituted tri-nuclear phenol having the structural formula

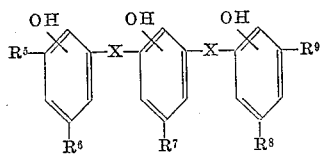

wherein $R^1$, $R^2$, $R^3$ and $R^4$ are alkyl groups containing up to nine carbon atoms, wherein at least one of the groups $R^5$, $R^6$, $R^7$, $R^8$ and $R^9$ is an alkoxy group containing up to nine carbon atoms, the remainder being alkyl groups containing up to nine carbon atoms and wherein X is a methylene group, an ethylidene group, an isopropylidene group or a sulphur atom.

The invention also includes compositions comprising an organic material susceptible to oxidative deterioration and one or more of the above specified alkoxy-substituted di- or tri-nuclear phenols. The alkoxy-substituted di- or tri-nuclear phenol may be incorporated into an ester having plasticising properties, for example into a phthalate of an alkanol containing from two to ten carbon atoms per molecule. In other embodiments of the invention, the alkoxy-substituted di- or tri-nuclear phenol is incorporated into polyethylene, polypropylene, polyvinyl chloride, a natural rubber or a synthetic rubber or other polymeric materials. In other embodiments of the invention, the alkoxy-substituted di- or tri-nuclear phenol is incorporated into hydrocarbons of the gasoline or kerosene boiling range, lubricating oils or other hydrocarbon mixtures.

Examples of the alkoxy-substituted di- or tri-nuclear phenols of the present invention include the following compounds:

2:2'-methylene-bis-(4-methyl-6-methoxyphenol)
2:6-bis-(2-hydroxy-3-methoxy-5-methylbenzyl)-4-methyl phenol
4:4'-methylene-bis-(2-methoxy-6-tertiary butyl phenol)
2:2'-thio-bis-(4-methyl-6-methoxyphenol)
2:2'-methylene-bis-(4-methyl-6-tertiary butoxy phenol)
2:2'-methylene-bis-(4-nonyl-6-methoxyphenol)
4:4'-methylene-bis-(2-methoxy-6-nonylphenol)
2:6-bis-(2-hydroxy-3-tertiary butyl-5-methylbenzyl)-4-methoxyphenol
4:6-bis-(2-hydroxy-3-methoxy-5-methylbenzyl)-2-methyl phenol
2:2'-ethylidene-bis-(4-methyl-6-methoxyphenol)
2:2'-isopropylidene-bis-(4-methyl-6-methoxyphenol)

The alkoxy-substituted di- or tri-nuclear phenols may be prepared by using any suitable method. Two molar proportions of the corresponding mono-nuclear alkoxy-substituted phenol may, for example, be condensed with one molar proportion of an aliphatic aldehyde, aliphatic ketone, or sulphur dichloride to prepare a di-nuclear phenol. Thus, for instance, if a methylene bridge is required in the molecule of the di-nuclear phenol, the mono-nuclear alkoxy-substituted phenol may be condensed with formaldehyde, preferably in the form of a formalin solution; if an ethylidene bridge is required, the phenol may be condensed with acetaldehyde; if an isopropylidene bridge is required, the phenol may be condensed with acetone. To prepare an alkoxy-substituted di-nuclear phenol containing a sulphur bridge, the corresponding mono-nuclear alkoxy-substituted phenol may be reacted with sulphur dichloride, dehydrochlorination taking place readily. If methylene bridges are required in a tri-nuclear phenol, at least two molar proportions of an alkyl- or alkoxy-substituted phenol may be condensed with one molar proportion of the corresponding dimethylol derivative of an alkyl- or alkoxy-substituted phenol.

The condensation may be carried out in a suitable solvent, such as ethanol, and it is advantageously carried out in the presence of a catalyst, such as hydrochloric acid or other acidic substances. It is particularly preferred to use, as catalyst, substances such as zinc acetate which bring about a preponderance of ortho-ortho bridging with respect to the phenolic hydroxy groups.

In an embodiment of the invention, the alkoxy-substituted di- or tri-nuclear phenol may be incorporated as an antioxidant into an organic compound—for example a phthalate ester, such as dioctyl phthalate—which is used as a plasticiser in the production of polymeric materials having desirable physical properties. The di- or tri-nuclear phenol may conveniently be added to and mixed with the organic compound to obtain a uniformly dispersed mixture; if for instance, the organic compound is a liquid ester, the di- or tri-nuclear phenol may be dissolved in it. Preferably the di- or tri-nuclear phenol is present in a proportion in the range from 0.01% to 0.5% by weight based on the weight of the mixture of organic compound and di- or tri-nuclear phenol.

When a mixture of the di- or tri-nuclear phenol and an organic compound has been prepared, it may be used in the preparation of a polymeric material without further addition of an antioxidant to prepare a stabilised product; the organic compound with which the di- or tri-nuclear phenol is incorporated may be a plasticiser, such as a phthalate ester used with polyvinyl chloride. The di- or tri-nuclear phenol may, however, be incorporated into a polymeric material such as polyethylene which does not usually require admixture with a plasticiser in order to show desirable physical properties. The di- or tri-nuclear phenol antioxidant may conveniently be incorporated into polyethylene by making a solution of the antioxidant in a volatile organic solvent, slurrying the solution with polyethylene powder and evaporating off the solvent; the antioxidant may also be added to liquid polyethylene.

When the alkoxy-substituted di- or tri-nuclear phenols of the present invention are incorporated as antioxidants into organic compounds or polymeric materials, other additive substances may also be incorporated; for instance, when the di- or tri-nuclear phenol is incorporated into polyvinyl chloride, additives such as basic lead carbonate, cadmium laurate, tin laurate or other stabilisers, and calcium stearate or other lubricants may be present. A typical mix of polyvinyl chloride may be made up by using the following proportions of materials:

100 parts by weight of polyvinyl chloride moulding powder
50 parts by weight of dioctyl phthalate
3 parts by weight of basic lead carbonate
0.5 part by weight of calcium stearate.

To this is added the di- or tri-nuclear phenol as antioxidant, preferably in an amount from 0.01 to 0.1 part by weight.

The following examples illustrate further the present invention. Parts by weight shown therein bear the same relationship to parts by volume as do kilograms to litres.

*Example 1*

100 parts by weight of 2-methoxy-4-methylphenol, 20 parts by weight of a 35% weight per volume aqueous solution of formaldehyde and 1 part by weight of zinc acetate were heated together at the boiling point of the mixture under reflux for two hours and the mixture was then allowed to stand for 18 hours at 18° C. Water which had formed during the reaction was then distilled off at atmospheric pressure.

The product was washed several times with a 10% volume per volume aqueous solution of ethanol and, after recrystallising from ethyl acetate, white crystals of 2:2'-methylene - bis - (4 - methyl - 6 - methoxyphenol) having a melting point at 126° C. were obtained.

The 2:2' - methylene - bis - (4 - methyl - 6 - methoxyphenol) can be represented by the structural formula:

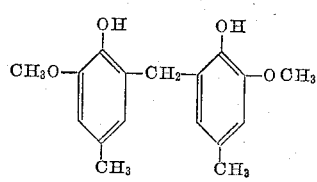

*Example 2*

A sample of linear polyethylene was washed with ethanol to remove stabilising compounds present. A mixture consisting of 0.1% by weight of 2:2'-methylene-bis-(4-methyl-6-methoxyphenol) in the polyethylene was then prepared by making a slurry of the polyethylene in a solution of the 2:2' - methylene - bis - (4 - methyl - 6 - methoxyphenol) in ethanol. The ethanol was then removed by evaporating at 40° C. in a vacuum oven and the polyethylene was pressed into a film 0.01 inch in thickness.

The "induction period," that is the time elapsing while maintaining the film at 150° C. before rapid oxidation of the film began, was measured and is given in the following table.

As a comparison with the present invention, samples of the same polyethylene were treated in the same way as described in Example 2 but incorporating, in one case, no antioxidant, and also incorporating 0.1% by weight of two known phenolic antioxidants, dicresylolpropane and 2:6-di-tertiary butyl-4-methylphenol and 0.1% by weight of the known amine antioxidant, N-phenyl-β-naphthylamine. The induction periods were measured and are also given in the table.

| Antioxidant | Induction period (hours) |
|---|---|
| 0.1% 2:2'-methylene-bis-(4-methyl-6-methoxyphenol) | 33.5 |
| None | 1 |
| 0.1% dicresylolpropane | 21.5 |
| 0.1% 2:6-di-tertiary butyl-4-methylphenol | 6 |
| 0.1% N-phenyl-β-naphthylamine | 6.5 |

*Example 3*

100 parts by weight of 2-methoxy-4-methylphenol, 45 parts by weight of 2:6-dimethylol-4-methylphenol and 1 part by weight of zinc acetate were heated together under reflux for 24 hours. The product was washed with a 10% solution of ethyl alcohol in water. 2:6-bis-(2-hydroxy - 3 - methoxy - 5 - methylbenzyl) - 4 - methylphenol was produced and, by extracting into ethyl acetate and concentrating the solution by evaporation, was obtained as white crystals. The 2:6 - bis - (2 - hydroxy - 3 - methoxy - 5 - methylbenzyl) - 4 - methylphenol obtained was recrystallised from heptane.

*Example 4*

100 parts by weight guaiacol and 32 parts by weight caustic soda were dissolved in 320 parts by weight water. To this mixture was added 35 parts by weight of 35% aqueous formaldehyde solution. The resulting mixture was heated at the reflux temperature for 5 hours and then cooled and neutralised with acetic acid. The solid reaction product was washed with water and then heated in vacuo to remove water and unreacted guaiacol, yielding 4:4'-methylene-bis-(2-methoxyphenol).

100 parts by weight of the 4:4'-methylene-bis-(2-methoxyphenol) were dissolved in 100 parts by weight of tertiary butanol and 900 parts by weight of benzene, containing 10 parts by weight of concentrated sulphuric acid. The mixture was stirred and heated to the reflux temperature; isobutene was then passed through the mixture until no more was absorbed. The benzene solution was washed free of acid and dried over anhydrous sodium sulphate. The resulting solution was poured on to a column of alumina and washed through with a mixture of equal volumes of methanol and ether. On removing the solvent 4:4'-methylene-bis-(2-methoxy-6-tertiary butyl phenol) was obtained.

*Example 5*

37 parts by weight sulphur dichloride dissolved in heptane were added slowly at room temperature to 100 parts by weight 2-methoxy-4-methylphenol, dissolved in heptane. A white precipitate of 2:2'-thio-bis-(4-methyl-6-methoxyphenol) was obtained which was filtered off and recrystallised from heptane.

*Example 6*

The procedure described in Example 2 was repeated using, instead of 0.1% by weight of 2:2'-methylene-bis-(4-methyl-6-methoxyphenol), 0.05% by weight of each of the following alkoxy-substituted di- or tri-nuclear phenols: 2:6-bis-(2-hydroxy-3-methoxy-5-methylbenzyl)-4-methylphenol, 2:2'-methylene-bis-(4-methyl-6-methoxyphenol), 4:4'-methylene-bis-(2-methoxy-6-tertiary butyl phenol) and 2:2'-thio-bis-(4-methyl-6-methoxyphenol). The polyethylene was in each case pressed into a film 0.065 inch in thickness.

The induction period of each film, as defined in Example 2, was measured and is given in the following table; in the same table is given the induction period of a sample of polyethylene treated in the same way except that no antioxidant was incorporated.

| Antioxidant | Induction period (hours) |
|---|---|
| None | 1 |
| 0.05% 2:6-bis-(2-hydroxy-3-methoxy-5-methylbenzyl)-4-methylphenol | 45 |
| 0.05% 2:2'-methylene-bis-(4-methyl-6-methoxyphenol) | 31 |
| 0.05% 4:4'-methylene-bis-(2-methoxy-6-tertiary butyl phenol) | 19 |
| 0.05% 2:2'-thio-bis-(4-methyl-6-methoxyphenol) | 10 |

I claim:
2:6-bis-(2-hydroxy - 3 - methoxy - 5 - methylbenzyl)-4-methylphenol.

References Cited in the file of this patent

UNITED STATES PATENTS

| | | |
|---|---|---|
| 2,331,448 | Winning et al. | Oct. 12, 1943 |
| 2,553,146 | Pearl | May 15, 1951 |
| 2,591,651 | Young | Apr. 1, 1952 |
| 2,625,568 | Young et al. | Jan. 13, 1953 |
| 2,724,727 | Pearl | Nov. 22, 1955 |
| 2,734,032 | Coppock | Feb. 7, 1956 |
| 2,769,784 | Young et al. | Nov. 6, 1956 |
| 2,781,403 | Kane | Feb. 12, 1957 |
| 2,862,976 | Dubbs et al. | Dec. 2, 1958 |